(12) United States Patent
Weng (10) Patent No.: US 11,163,991 B2
(45) Date of Patent: Nov. 2, 2021

(54) METHOD AND APPARATUS FOR DETECTING BODY

(71) Applicant: Baidu Online Network Technology (Beijing) Co., Ltd., Beijing (CN)

(72) Inventor: Renliang Weng, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 85 days.

(21) Appl. No.: 16/130,239

(22) Filed: Sep. 13, 2018

(65) Prior Publication Data

US 2019/0197299 A1  Jun. 27, 2019

(30) Foreign Application Priority Data

Dec. 27, 2017 (CN) .......................... 201711440851.8

(51) Int. Cl.
*G06K 9/00* (2006.01)
*G06K 9/46* (2006.01)
*G06K 9/62* (2006.01)
*G06N 7/00* (2006.01)
*G06N 3/04* (2006.01)
*G06N 3/08* (2006.01)

(52) U.S. Cl.
CPC .......... *G06K 9/00369* (2013.01); *G06K 9/46* (2013.01); *G06K 9/6202* (2013.01); *G06K 9/6256* (2013.01); *G06N 3/0454* (2013.01); *G06N 3/08* (2013.01); *G06N 7/005* (2013.01)

(58) Field of Classification Search
CPC ............. G06K 9/00369; G06K 9/6202; G06K 9/6256; G06K 9/46; G06K 9/6204; G06K 9/6271; G06K 9/6262; G06K 9/4671; G06K 9/6276; G06K 9/627; G06K 9/00362; G06N 3/0454; G06N 3/08; G06N 7/005; G06N 3/084
See application file for complete search history.

(56) References Cited

U.S. PATENT DOCUMENTS

2014/0140596 A1* 5/2014 Kawaguchi ........ G06K 9/00348
                                                    382/128
2018/0186452 A1* 7/2018 Tian ..................... G05D 1/0094

FOREIGN PATENT DOCUMENTS

CN    106778614 A    5/2017
CN    106780612 A    5/2017
CN    106845395 A    6/2017

* cited by examiner

*Primary Examiner* — Marcos L Torres
(74) *Attorney, Agent, or Firm* — Nixon Peabody LLP (57) ABSTRACT

Embodiments of the present disclosure disclose a method and apparatus for detecting a body. A specific embodiment of the method includes: acquiring a to-be-detected image, the to-be-detected image including a body image; importing the to-be-detected image into a pre-established body key point detection model to obtain a body frame of a body corresponding to the body image, a position of a body key point, and a judgment result of whether the body key point belongs to the body in the to-be-detected image; and outputting the body frame of the body corresponding to the body image, the position of the body key point, and the judgment result of whether the body key point belongs to the body in the to-be-detected image.

13 Claims, 3 Drawing Sheets

METHOD AND APPARATUS FOR DETECTING BODY

CROSS-REFERENCE TO RELATED APPLICATIONS

This application claims priority to Chinese Patent Application no. 201711440851.8, filed with the China National Intellectual Property Administration (CNIPA) on Dec. 27, 2017, the contents of which are incorporated herein by reference in their entirety.

TECHNICAL FIELD

Embodiments of the present disclosure relate to the field of computer technology, specifically relate to the field of image processing technology, and more specifically relate to a method and apparatus for detecting a body.

BACKGROUND

Body detection has many important applications in the field of computer vision, such as video monitoring, image retrieval, human-computer interaction, and driver assistance systems. The purpose of body detection is to output the positions of all bodies in an image. Currently an original image including a body image may be first processed to obtain the minimum frame of the body in the original image. After that, the minimum frame of the body is extracted from the original image. Then, processing such as body key point recognition is performed on the extracted minimum frame of the body. Therefore, the body detection has a complex process, needs a huge calculation amount, and thus cannot fulfil the requirement of real-time processing.

SUMMARY

Embodiments of the present disclosure propose a method and apparatus for detecting a body.

In a first aspect, the embodiments of the present disclosure provide a method for detecting a body. The method includes: acquiring a to-be-detected image, the to-be-detected image including a body image; importing the to-be-detected image into a pre-established body key point detection model to obtain a body frame of a body corresponding to the body image, a position of a body key point, and a judgment result of whether the body key point belongs to the body in the to-be-detected image, the body key point detection model being used to characterize a corresponding relationship between the to-be-detected image and the body frame of the body corresponding to the body image, the position of the body key point, and the judgment result of whether the body key point belongs to the body in the to-be-detected image; and outputting the body frame of the body corresponding to the body image, the position of the body key point, and the judgment result of whether the body key point belongs to the body in the to-be-detected image.

In some embodiments, the body key point detection model includes a feature extraction network, a body detection network, and a body key point detection network.

In some embodiments, the importing the to-be-detected image into a pre-established body key point detection model to obtain a body frame of a body corresponding to the body image, a position of a body key point, and a judgment result of whether the body key point belongs to the body in the to-be-detected image, includes: importing the to-be-detected image into the feature extraction network to obtain a first feature map, wherein the feature extraction network is used to characterize a corresponding relationship between the to-be-detected image and the first feature map; importing the first feature map into the body detection network to obtain a body feature area in the first feature map, wherein the body detection network is used to characterize a corresponding relationship between the first feature map and the body feature area; obtaining the body frame of the body corresponding to the body image in the to-be-detected image based on the body feature area; and importing the body feature area into the body key point detection network to obtain the position of the body key point, and the judgment result of whether the body key point belongs to the body in the to-be-detected image, wherein the body key point detection network is used to characterize a corresponding relationship between the body feature area, and the position of the body key point and the judgment result of whether the body key point belongs to the body.

In some embodiments, the body detection network includes a first convolutional neural network and a second convolutional neural network.

In some embodiments, the importing the first feature map into the body detection network to obtain a body feature area in the first feature map includes: importing the first feature map into the first convolutional neural network to obtain a second feature map, wherein the first convolutional neural network is used to characterize a corresponding relationship between the first feature map and the second feature map; importing the second feature map into the second convolutional neural network to obtain a probability map, wherein a pixel value in the probability map indicates a probability of an area being the body, and the second convolutional neural network is used to characterize a corresponding relationship between the second feature map and the probability map; and acquiring, in the first feature map, the area corresponding to a position in the probability map having the pixel value greater than a predetermined first probability threshold as the body feature area.

In some embodiments, the acquiring, in the first feature map, the area corresponding to a position in the probability map having the pixel value greater than a predetermined first probability threshold as the body feature area, includes: calculating a first proportional relationship between the probability map and the first feature map; and acquiring the body feature area from the first feature map based on the first proportional relationship.

In some embodiments, the obtaining the body frame of the body corresponding to the body image in the to-be-detected image based on the body feature area includes: calculating a second proportional relationship between the first feature map and the to-be-detected image; determining, based on a coordinate of a vertex of the body feature area and the second proportional relationship, a corresponding coordinate of the vertex of the body feature area in the to-be-detected image; and determining the body frame in the to-be-detected image based on the corresponding coordinate of the vertex of the body feature area in the to-be-detected image.

In some embodiments, the body key point detection model is obtained by training through the following approach: acquiring a set of samples, wherein each of the samples is a sample image including an annotation, and the annotation includes the body frame of the body corresponding to the body image, the position of the body key point, and the judgment result of whether the body key point belongs to the body in the sample image; and training an initial convolutional neural network by using the set of samples to obtain the body key point detection model.

In a second aspect, the embodiments of the present disclosure provide an apparatus for detecting a body. The apparatus includes: an acquisition unit, configured to acquire a to-be-detected image, the to-be-detected image including a body image; a detection unit, configured to import the to-be-detected image into a pre-established body key point detection model to obtain a body frame of a body corresponding to the body image, a position of a body key point, and a judgment result of whether the body key point belongs to the body in the to-be-detected image, the body key point detection model being used to characterize a corresponding relationship between the to-be-detected image and the body frame of the body corresponding to the body image, the position of the body key point, and the judgment result of whether the body key point belongs to the body in the to-be-detected image; and an output unit, configured to output the body frame of the body corresponding to the body image, the position of the body key point, and the judgment result of whether the body key point belongs to the body in the to-be-detected image.

In some embodiments, the body key point detection model includes a feature extraction network, a body detection network, and a body key point detection network.

In some embodiments, the detection unit includes: an extraction unit, configured to import the to-be-detected image into the feature extraction network to obtain a first feature map, wherein the feature extraction network is used to characterize a corresponding relationship between the to-be-detected image and the first feature map; a body detection unit, configured to import the first feature map into the body detection network to obtain a body feature area in the first feature map, wherein the body detection network is used to characterize a corresponding relationship between the first feature map and the body feature area; a body frame acquisition unit, configured to obtain the body frame of the body corresponding to the body image in the to-be-detected image based on the body feature area; and a key point detection unit, configured to import the body feature area into the body key point detection network to obtain the position of the body key point, and the judgment result of whether the body key point belongs to the body in the to-be-detected image, wherein the body key point detection network is used to characterize a corresponding relationship between the body feature area, and the position of the body key point and the judgment result of whether the body key point belongs to the body.

In some embodiments, the body detection network includes a first convolutional neural network and a second convolutional neural network.

In some embodiments, the body detection unit includes: a feature extraction unit, configured to import the first feature map into the first convolutional neural network to obtain a second feature map, wherein the first convolutional neural network is used to characterize a corresponding relationship between the first feature map and the second feature map; a probability map generation unit, configured to import the second feature map into the second convolutional neural network to obtain a probability map, wherein a pixel value in the probability map indicates a probability of an area being the body, and the second convolutional neural network is used to characterize a corresponding relationship between the second feature map and the probability map; and an area acquisition unit, configured to acquire, in the first feature map, the area corresponding to a position in the probability map having the pixel value greater than a predetermined first probability threshold as the body feature area.

In some embodiments, the area acquisition unit is further configured to: calculate a first proportional relationship between the probability map and the first feature map; and acquire the body feature area from the first feature map based on the first proportional relationship.

In some embodiments, the body frame acquisition unit is further configured to: calculate a second proportional relationship between the first feature map and the to-be-detected image; determine, based on a coordinate of a vertex of the body feature area and the second proportional relationship, a corresponding coordinate of the vertex of the body feature area in the to-be-detected image; and determine the body frame in the to-be-detected image based on the corresponding coordinate of the vertex of the body feature area in the to-be-detected image.

In some embodiments, the apparatus further includes a model training unit, and the model training unit is configured to: acquire a set of samples, wherein each of the samples is a sample image including an annotation, and the annotation includes the body frame of the body corresponding to the body image, the position of the body key point, and the judgment result of whether the body key point belongs to the body in the sample image; and train an initial convolutional neural network by using the set of samples to obtain the body key point detection model.

In a third aspect, the embodiments of the present disclosure provide a terminal, including: one or more processors; and a storage apparatus, for storing one or more programs, the one or more programs, when executed by the one or more processors, cause the one or more processors to implement the method according to the first aspect.

In a fourth aspect, the embodiments of the present disclosure provide a computer readable storage medium, storing a computer program thereon, the program, when executed by a processor, implements the method for acquiring information according to the first aspect.

The method and apparatus for detecting a body provided by the embodiments of the present disclosure first acquires a to-be-detected image, then imports the to-be-detected image into a pre-established body key point detection model to obtain a body frame of a body corresponding to the body image, a position of a body key point, and a judgment result of whether the body key point belongs to the body in the to-be-detected image, and finally outputs the body frame of the body corresponding to the body image, the position of the body key point, and the judgment result of whether the body key point belongs to the body in the to-be-detected image, thereby simplifying the process of body detection and improving the efficiency of body detection.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
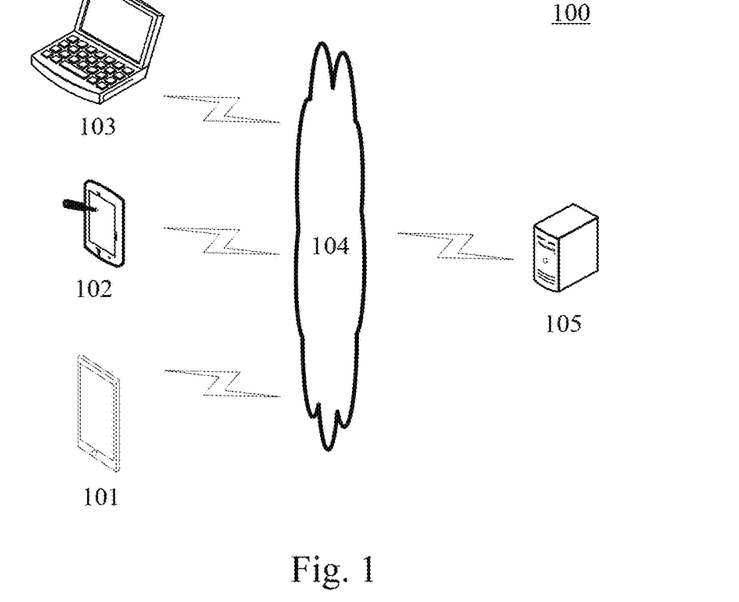
FIG. 1 is an exemplary system architecture diagram to which the present disclosure may be applied.

FIG. 1 shows an illustrative architecture of a system 100 which may be used by a method detecting a body for or an apparatus for detecting a body according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Various communication client applications, such as image processing applications and webpage browser applications may be installed on the terminal devices 101, 102, and 103.

The terminal devices 101, 102, and 103 may be various electronic devices having a display capable of processing an image, including but not limited to, smart phones, tablet computers, laptop computers, and desktop computers.

The server 105 may be a server providing various services, for example, a back end server providing support for the information displayed on the terminal device 101, 102 or 103. The back end server may acquire a to-be-detected image from the terminal device, perform processing such as body detection on the to-be-detected image, and return a processing result to the terminal device for display.

It should be noted that the method for detecting a body provided by the embodiments of the present disclosure may be performed by the terminal device 101, 102, or 103, or may be performed by the server 105. Accordingly, the apparatus for detecting a body may be provided in the terminal device 101, 102, or 103, or may be provided in the server 105. The present disclosure does not have any limitations with this respect.

It should be understood that the numbers of the terminal devices, the networks and the servers in FIG. 1 are merely illustrative. Any number of terminal devices, networks and servers may be provided based on the actual requirements.

Figure 2:
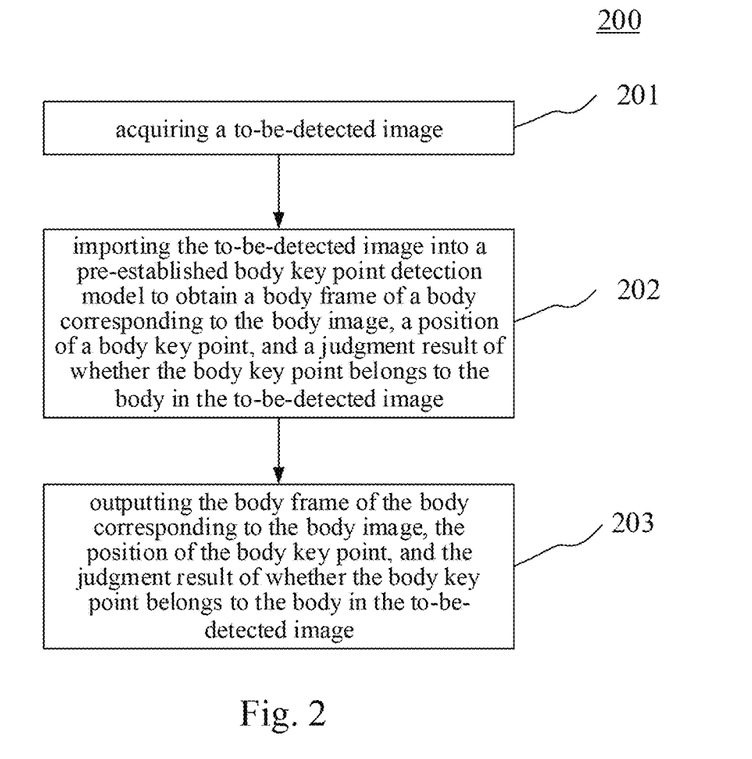
FIG. 2 is a flowchart of an embodiment of a method for detecting a body according to the present disclosure.

With further reference to FIG. 2, a flow 200 of an embodiment of the method for detecting a body according to the present disclosure is illustrated. The method for detecting a body includes the following steps:

Step 201, acquiring a to-be-detected image.

In the present embodiment, the electronic device (e.g., the terminal device 101, 102 or 103 as shown in FIG. 1) on which the method for detecting a body operate may acquire a to-be-detected image locally or from other electronic devices storing the to-be-detected image. Here, the to-be-detected image includes a body image.

Step 202, importing the to-be-detected image into a pre-established body key point detection model to obtain a body frame of a body corresponding to the body image, a position of a body key point, and a judgment result of whether the body key point belongs to the body in the to-be-detected image.

In the present embodiment, the electronic device may import the to-be-detected image into a pre-established body key point detection model to obtain a body frame of a body corresponding to the body image, a position of a body key point, and a judgment result of whether the body key point belongs to the body in the to-be-detected image. For example, the body frame may be a rectangular frame for defining the body, and the body key point may be key points of the body, such as the head, the hands, the feet, the waist, and the shoulders. It should be noted that the body key point detection model may be used to characterize the corresponding relationship between the to-be-detected image and the body frame of the body corresponding to the body image, the position of the body key point, and the judgment result of whether the body key point belongs to the body in the to-be-detected image. For example, the body key point detection model may be a corresponding relationship table storing a corresponding relationship between a plurality of images and body detection results pre-defined by technicians based on statistics of a large number of images and body detection results. Here, the body detection result includes the body frame of the body corresponding to the body image, the position of the body key point, and the judgment result of whether the body key point belongs to the body in the to-be-detected image.

In some alternative implementations of the present embodiment, the body key point detection model may include a feature extraction network, a body detection network, and a body key point detection network. For example, the feature extraction network may be used to extract feature information from the to-be-detected image to obtain a feature map of the to-be-detected image. For example, the feature extraction network may be an artificial neural network. The body detection network is used to detect the body frame on the feature map of the to-be-detected image. The body key point detection network is used to detect the position of the body key point, and judge whether the detected body key point belongs to the body.

In some alternative implementations, the step 202 may specifically include: first, the electronic device may import the to-be-detected image into the feature extraction network to obtain a first feature map. Here, the feature extraction network may be used to characterize a corresponding relationship between the to-be-detected image and the first feature map. For example, the feature extraction network may be implemented using a convolutional neural network. Secondly, the electronic device may import the first feature map into the body detection network to obtain a body feature area in the first feature map. Here, the body detection network may be used to characterize a corresponding relationship between the first feature map and the body feature area. For example, the body detection network may be implemented using a convolutional neural network. Then, the electronic device may obtain the body frame of the body corresponding to the body image in the to-be-detected image based on the body feature area. Finally, the electronic device may import the body feature area into the body key point detection network to obtain the position of the body key point, and the judgment result of whether the body key point belongs to the body in the to-be-detected image. Here, the body key point detection network may be used to characterize a corresponding relationship between the body feature area, and the position of the body key point and the judgment result of whether the body key point belongs to the body. Here, the position of the body key point is the position of the body key point in the to-be-detected image. The electronic device may determine, according to the proportional relationship between the first feature map and the to-be-detected image, a corresponding position of each pixel on the body feature area in the first feature map in the to-be-detected image. For example, the body key point detection network may be implemented using a convolutional neural network.

Alternatively, the body detection network may include a first convolutional neural network and a second convolutional neural network.

Alternatively, the importing the first feature map into the body detection network to obtain a body feature area in the first feature map may specifically include: first, the electronic device may import the first feature map into the first convolutional neural network to obtain a second feature map. Here, the first convolutional neural network may be used to characterize a corresponding relationship between the first feature map and the second feature map. Here, the depth of the network may be increased by the first convolutional neural network, thereby obtaining the image feature of a higher order. Then, the electronic device may import the second feature map into the second convolutional neural network to obtain a probability map. Here, a pixel value in the probability map indicates the probability that the area is the body, and the second convolutional neural network may be used to characterize a corresponding relationship between the second feature map and the probability map. For example, the second convolutional neural network may include a 1*1 convolution layer and a softmax activation function layer. Here, the 1*1 convolution layer may implement a dimensionality reduction function, and the output of the softmax activation function layer is the probability map. The pixel value in the probability map indicates the probability that the area where the pixel value is located is a body, and the pixel value in the probability map may be a value between 0 and 1. Finally, the electronic device may acquire, in the first feature map, the area corresponding to a position in the probability map having the pixel value greater than a predetermined first probability threshold as the body feature area.

Alternatively, the acquiring, in the first feature map, the area corresponding to a position in the probability map having the pixel value greater than a predetermined first probability threshold as the body feature area, may specifically include: first, the electronic device may calculate a first proportional relationship between the probability map and the first feature map. Then, the electronic device may acquire the body feature area from the first feature map based on the first proportional relationship. For example, when the first proportional relationship between the probability map and the first feature map is 1:10, that is, both the length ratio and the height ratio are 1:10, it indicates that each pixel point in the probability map corresponds to a 10*10 area in the first feature map.

Alternatively, the obtaining the body frame of the body corresponding to the body image in the to-be-detected image based on the body feature area may specifically include: first, the electronic device may calculate a second proportional relationship between the first feature map and the to-be-detected image. Then, the electronic device may determine, based on a coordinate of a vertex of the body feature area and the second proportional relationship, the corresponding coordinate of the vertex of the body feature area in the to-be-detected image. For example, when the second proportional relationship between the first feature map and the to-be-detected image is 1:20, that is, both the length ratio and the height ratio are 1:20, and the coordinate of a point on the first feature map is (x, y), the corresponding coordinate of the coordinate of the point in the to-be-detected image may be (20x, 20y). Finally, the electronic device may determine the body frame in the to-be-detected image based on the corresponding coordinate of the vertex of the body feature area in the to-be-detected image. For example, the body frame in the to-be-detected image may be a rectangular frame.

In some alternative implementations of the present embodiment, the body key point detection model may be obtained by the electronic device or other electronic devices for training the body key point detection model by training through a following approach:

First, a set of samples may be acquired. Here, each of the samples in the set of samples is a sample image including an annotation. The annotation includes the body frame of the body corresponding to the body image, the position of the body key point, and the judgment result of whether the body key point belongs to the body in the sample image.

Then, an initial convolutional neural network may be trained by using the set of samples to obtain the body key point detection model. For example, the sample image of the sample may be used as the input of the initial convolutional neural network, the annotation of the sample may be used as the output of the initial convolutional neural network, and the body key point detection model is trained based on a preset loss function and a back propagation algorithm. The loss function may be used to characterize the error between an output result of the initial convolutional neural network and the annotation of the sample. The goal of the training is to minimize the value of the loss function. It should be noted that the back propagation algorithm (BP algorithm) may also be referred to as an error back propagation algorithm. The BP algorithm consists of two processes: the forward propagation of the signal and the back propagation of the error in the learning process. In a feedforward network, the input signal is inputted through an input layer, calculated by a hidden layer, and outputted by an output layer. The outputted result is compared with the annotation. If there is an error, the error is back propagated from the output layer to the input layer. In this process, neuron weights (e.g., a parameter of the convolution kernel in the convolutional layer) may be adjusted using a gradient descent algorithm (e.g., a stochastic gradient descent algorithm). Here, the initial convolutional neural network may be obtained by various methods, for example, obtained by randomly generating network parameters based on the existing convolutional neural network. It should be noted that the body key point detection model is only used to explain the adjustment process of the parameter of the body key point detection model. It may be considered that the initial convolutional neural network is a model before the parameter is adjusted, and the body key point detection model is a parameter-adjusted model. The adjustment process of the parameter of the model is not limited to one time, and may be repeated multiple times according to the optimization level of the model and actual needs.

Step 203, outputting the body frame of the body corresponding to the body image, the position of the body key point, and the judgment result of whether the body key point belongs to the body in the to-be-detected image.

In the present embodiment, the electronic device may output the body frame of the body corresponding to the body image, the position of the body key point, and the judgment result of whether the body key point belongs to the body in the to-be-detected image obtained in step 202. For example, the electronic device may display, in the to-be-detected image, the body frame of the body corresponding to the body image, the position of the body key point, and the judgment result of whether the body key point belongs to the body in the to-be-detected image.

Figure 3:
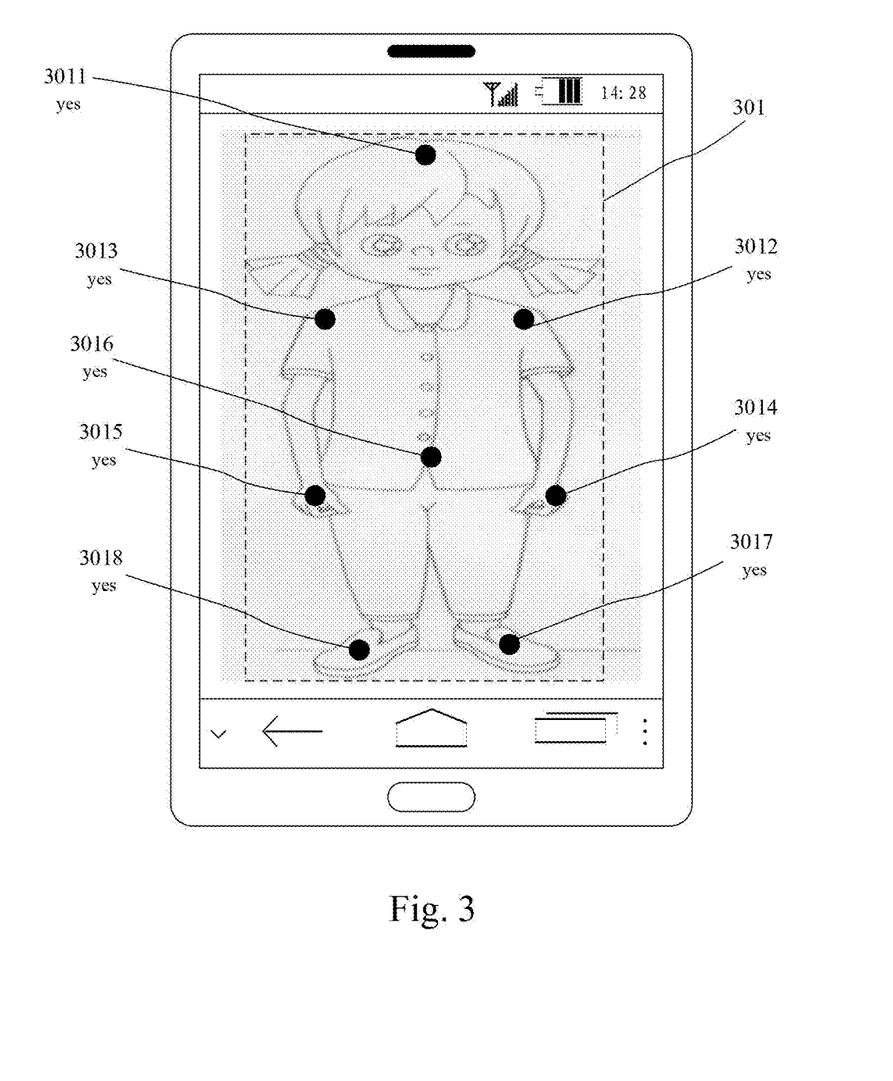
FIG. 3 is a schematic diagram of an application scenario of the method for detecting a body according to the present disclosure.

With further reference to FIG. 3, a schematic diagram of an application scenario of the method for detecting a body according to the present embodiment is illustrated. In the application scenario of FIG. 3, the electronic device first acquires a to-be-detected image, the to-be-detected image including a body image of a body A. Then, the electronic device may import the to-be-detected image into a pre-established body key point detection model to obtain a body frame of a body corresponding to the body image, a position of a body key point, and a judgment result of whether the body key point belongs to the body in the to-be-detected image. Finally, the electronic device may output the body frame of the body corresponding to the body image, the position of the body key point, and the judgment result of whether the body key point belongs to the body in the to-be-detected image. As shown in FIG. 3, the body frame of the body A is 301, and the body key point of the body A includes the head 3011, the left shoulder 3012, the right shoulder 3013, the left hand 3014, the right hand 3015, the waist 3016, the left foot 3017, and the right foot 3018. If the body key point belongs to the body A, the judgment result "Yes" is outputted; and if it does not belong to the body A, the judgment result "No" is outputted.

The method provided by the above embodiment of the present disclosure may obtain the body frame of the body corresponding to the body image, the position of the body key point, and the judgment result of whether the body key point belongs to the body in the to-be-detected image by the body key point detection model. Since it is not necessary to extract the body frame from the original to-be-detected image and then perform the body key point detection, the process of body detection is simplified, and the efficiency of body detection is improved.

Figure 4:
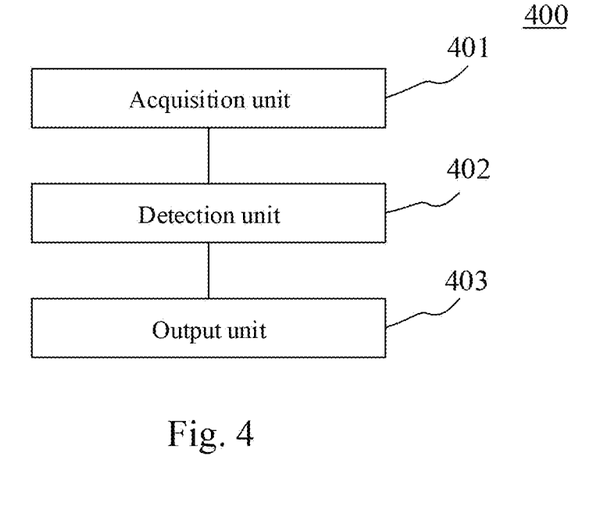
FIG. 4 is a schematic structural diagram of an embodiment of an apparatus for detecting a body according to the present disclosure.

With further reference to FIG. 4, as an implementation to the method shown in the above figures, the present disclosure provides an embodiment of an apparatus for detecting a body. The apparatus embodiment corresponds to the method embodiment shown in FIG. 2, and the apparatus may specifically be applied to various electronic devices.

As shown in FIG. 4, the apparatus 400 for detecting a body of the present embodiment includes: an acquisition unit 401, a detection unit 402, and an output unit 403. The acquisition unit 401 is configured to acquire a to-be-detected image, the to-be-detected image including a body image. The detection unit 402 is configured to import the to-be-detected image into a pre-established body key point detection model to obtain a body frame of a body corresponding to the body image, a position of a body key point, and a judgment result of whether the body key point belongs to the body in the to-be-detected image, the body key point detection model being used to characterize a corresponding relationship between the to-be-detected image and the body frame of the body corresponding to the body image, the position of the body key point, and the judgment result of whether the body key point belongs to the body in the to-be-detected image. The output unit 403 is configured to output the body frame of the body corresponding to the body image, the position of the body key point, and the judgment result of whether the body key point belongs to the body in the to-be-detected image.

In the present embodiment, the specific processing of the acquisition unit 401, the detection unit 402 and the output unit 403 of the apparatus 400 for detecting a body and the technical effects thereof may be respectively referred to the related descriptions of step 201, step 202, and step 203 in the corresponding embodiment of FIG. 2, and detailed description thereof will be omitted.

In some alternative implementations of the present embodiment, the body key point detection model may include a feature extraction network, a body detection network, and a body key point detection network.

In some alternative implementations of the present embodiment, the detection unit 402 may include: an extraction unit (not shown in the figure), configured to import the to-be-detected image into the feature extraction network to obtain a first feature map, wherein the feature extraction network is used to characterize a corresponding relationship between the to-be-detected image and the first feature map; a body detection unit (not shown in the figure), configured to import the first feature map into the body detection network to obtain a body feature area in the first feature map, wherein the body detection network is used to characterize a corresponding relationship between the first feature map and the body feature area; a body frame acquisition unit (not shown in the figure), configured to obtain the body frame of the body corresponding to the body image in the to-be-detected image based on the body feature area; and a key point detection unit (not shown in the figure), configured to import the body feature area into the body key point detection network to obtain the position of the body key point, and the judgment result of whether the body key point belongs to the body in the to-be-detected image, wherein the body key point detection network is used to characterize a corresponding relationship between the body feature area, and the position of the body key point and the judgment result of whether the body key point belongs to the body.

In some alternative implementations of the present embodiment, the body detection network may include a first convolutional neural network and a second convolutional neural network.

In some alternative implementations of the present embodiment, the body detection unit may include: a feature extraction unit (not shown in the figure), configured to import the first feature map into the first convolutional neural network to obtain a second feature map, wherein the first convolutional neural network is used to characterize a corresponding relationship between the first feature map and the second feature map; a probability map generation unit (not shown in the figure), configured to import the second feature map into the second convolutional neural network to obtain a probability map, wherein a pixel value in the probability map indicates a probability of an area being the body, and the second convolutional neural network is used to characterize a corresponding relationship between the second feature map and the probability map; and an area acquisition unit (not shown in the figure), configured to acquire, in the first feature map, the area corresponding to a position in the probability map having the pixel value greater than a predetermined first probability threshold as the body feature area.

In some alternative implementations of the present embodiment, the area acquisition unit may be further configured to: calculate a first proportional relationship between the probability map and the first feature map; and acquire the body feature area from the first feature map based on the first proportional relationship.

In some alternative implementations of the present embodiment, the body frame acquisition unit may be further configured to: calculate a second proportional relationship between the first feature map and the to-be-detected image; determine, based on a coordinate of a vertex of the body feature area and the second proportional relationship, a corresponding coordinate of the vertex of the body feature area in the to-be-detected image; and determine the body frame in the to-be-detected image based on the corresponding coordinate of the vertex of the body feature area in the to-be-detected image.

In some alternative implementations of the present embodiment, the apparatus further includes a model training unit (not shown in the figure), and the model training unit is configured to: acquire a set of samples, wherein each of the samples is a sample image including an annotation, and the annotation includes the body frame of the body corresponding to the body image, the position of the body key point, and the judgment result of whether the body key point belongs to the body in the sample image; and train an initial convolutional neural network by using the set of samples to obtain the body key point detection model.

Figure 5:
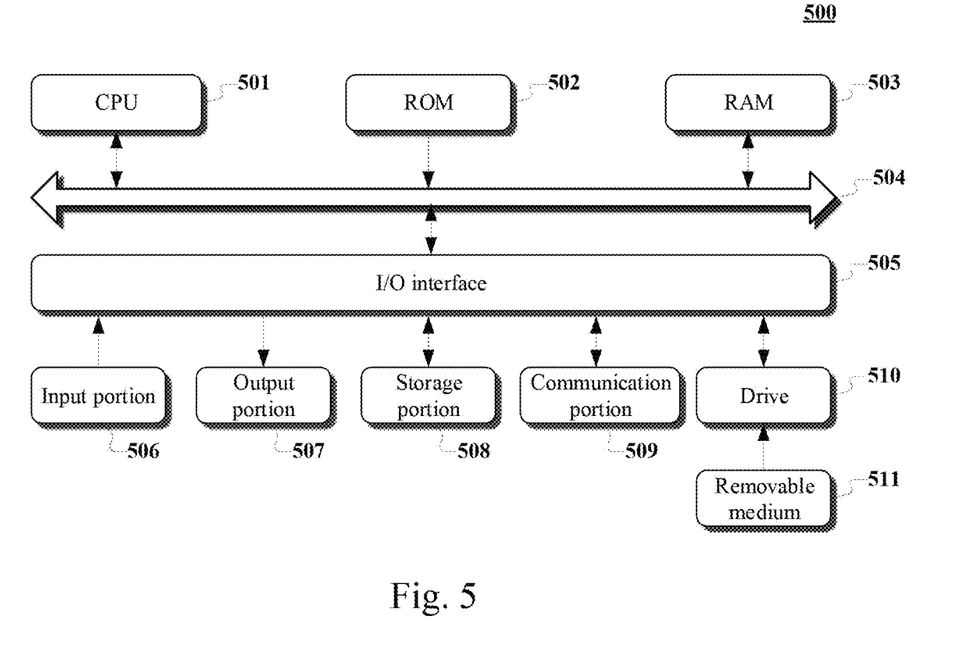
FIG. 5 is a schematic structural diagram of a computer system adapted to implement a terminal device of the embodiments of the present disclosure.

Referring to FIG. 5, a schematic structural diagram of a computer system 500 adapted to implement a terminal device of the embodiments of the present application is shown. The terminal device shown in FIG. 5 is merely an example and should not impose any restriction on the function and scope of use of the embodiments of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, a detection unit, and an output unit, where the names of these units or modules do not in some cases constitute a limitation to such units or modules themselves. For example, the acquisition unit may also be described as "a unit for acquiring a to-be-detected image."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a to-be-detected image, the to-be-detected image comprising a body image; import the to-be-detected image into a pre-established body key point detection model to obtain a body frame of a body corresponding to the body image, a position of a body key point, and a judgment result of whether the body key point belongs to the body in the to-be-detected image, the body key point detection model being used to characterize a corresponding relationship between the to-be-detected image and the body frame of the body corresponding to the body image, the position of the body key point, and the judgment result of whether the body key point belongs to the body in the to-be-detected image; and output the body frame of the body corresponding to the body image, the position of the body key point, and the judgment result of whether the body key point belongs to the body in the to-be-detected image.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for detecting a body, the method comprising:
    acquiring a to-be-detected image, the to-be-detected image comprising a body image;
    detecting a body frame of a body corresponding to the body image, and a position of a body key point, and determining a judgment result of whether the detected body key point belongs to the body corresponding to the body image in the to-be-detected image by importing the to-be-detected image into a pre-established body key point detection model, the body key point detection model comprising a feature extraction network, a body detection network, and a body key point detection network, and judge whether the detected body key point belongs to the body corresponding to the body image in the to-be-detected image; and
    outputting the body frame of the body corresponding to the body image, the position of the body key point, and the judgment result of whether the detected body key point belongs to the body in the to-be-detected image;
    wherein the detecting the body frame of the body corresponding to the body image, and the position of the body key point, and determining the judgment result of whether the detected body key point belongs to the body corresponding to the body image in the to-be-detected image by importing the to-be-detected image into the pre-established body key point detection model, comprises:
        importing the to-be-detected image into the feature extraction network to obtain a first feature map, wherein a corresponding relationship between the to-be-detected image and the first feature map is represented by the feature extraction network;
        importing the first feature map into the body detection network to obtain a body feature area in the first feature map, wherein a corresponding relationship between the first feature map and the body feature area is represented by the body detection network;
        obtaining the body frame of the body corresponding to the body image in the to-be-detected image based on the body feature area; and
        importing the body feature area into the body key point detection network to obtain the position of the body key point, and the judgment result of whether the body key point belongs to the body corresponding to the body image in the to-be-detected image, wherein a corresponding relationship between the body feature area, and the position of the body key point and the judgment result of whether the body key point belongs to the body is represented by the body key point detection network.

2. The method according to claim 1, wherein the body detection network comprises a first convolutional neural network and a second convolutional neural network.

3. The method according to claim 2, wherein the importing the first feature map into the body detection network to obtain the body feature area in the first feature map comprises:
    importing the first feature map into the first convolutional neural network to obtain a second feature map, wherein the first convolutional neural network is used to characterize a corresponding relationship between the first feature map and the second feature map, the first feature map being different from the second feature map;
    importing the second feature map into the second convolutional neural network to obtain a probability map, wherein a pixel value in the probability map indicates a probability of an area being the body, and the second convolutional neural network is used to characterize a corresponding relationship between the second feature map and the probability map; and
    acquiring, in the first feature map, the area corresponding to a position in the probability map having the pixel value greater than a predetermined first probability threshold as the body feature area.

4. The method according to claim 3, wherein the acquiring, in the first feature map, the area corresponding to the position in the probability map having the pixel value greater than the predetermined first probability threshold as the body feature area, comprises:
    calculating a first proportional relationship between the probability map and the first feature map; and
    acquiring the body feature area from the first feature map based on the first proportional relationship.

5. The method according to claim 4, wherein the obtaining the body frame of the body corresponding to the body image in the to-be-detected image based on the body feature area comprises:
    calculating a second proportional relationship between the first feature map and the to-be-detected image;
    determining, based on a coordinate of a vertex of the body feature area and the second proportional relationship, a corresponding coordinate of the vertex of the body feature area in the to-be-detected image; and
    determining the body frame in the to-be-detected image based on the corresponding coordinate of the vertex of the body feature area in the to-be-detected image.

6. The method according to claim 1, wherein the body key point detection model is obtained by training through a following approach:

acquiring a set of samples, wherein each of the samples is a sample image comprising an annotation, and the annotation includes the body frame of the body corresponding to the body image, the position of the body key point, and the judgment result of whether the body key point belongs to the body in the sample image; and training an initial convolutional neural network by using the set of samples to obtain the body key point detection model.

7. An apparatus for detecting a body, the apparatus comprising:

at least one processor; and a memory storing instructions, wherein the instructions, when executed by the at least one processor, cause the at least one processor to perform operations, the operations comprising:

acquiring a to-be-detected image, the to-be-detected image comprising a body image;

detecting a body frame of a body corresponding to the body image, and a position of a body key point, and determining a judgment result of whether the detected body key point belongs to the body corresponding to the body image in the to-be-detected image by importing the to-be-detected image into a pre-established body key point detection model, the body key point detection model comprising a feature extraction network, a body detection network, and a body key point detection network, and judge whether the detected body key point belongs to the body corresponding to the body image in the to-be-detected image; and outputting the body frame of the body corresponding to the body image, the position of the body key point, and the judgment result of whether the detected body key point belongs to the body in the to-be-detected image;

wherein the detecting the body frame of the body corresponding to the body image, and the position of the body key point, and determining the judgment result of whether the detected body key point belongs to the body corresponding to the body image in the to-be-detected image by importing the to-be-detected image into the pre-established body key point detection model, comprises:

importing the to-be-detected image into the feature extraction network to obtain a first feature map, wherein a corresponding relationship between the to-be-detected image and the first feature map is represented by the feature extraction network;

importing the first feature map into the body detection network to obtain a body feature area in the first feature map, wherein a corresponding relationship between the first feature map and the body feature area is represented by the body detection network;

obtaining the body frame of the body corresponding to the body image in the to-be-detected image based on the body feature area; and importing the body feature area into the body key point detection network to obtain the position of the body key point, and the judgment result of whether the body key point belongs to the body corresponding to the body image in the to-be-detected image, wherein a corresponding relationship between the body feature area, and the position of the body key point and the judgment result of whether the body key point belongs to the body is represented by the body key point detection network.

8. The apparatus according to claim 7, wherein the body detection network comprises a first convolutional neural network and a second convolutional neural network.

9. The apparatus according to claim 8, wherein the importing the first feature map into the body detection network to obtain the body feature area in the first feature map comprises:

importing the first feature map into the first convolutional neural network to obtain a second feature map, wherein the first convolutional neural network is used to characterize a corresponding relationship between the first feature map and the second feature map, the first feature map being different from the second feature map;

importing the second feature map into the second convolutional neural network to obtain a probability map, wherein a pixel value in the probability map indicates a probability of an area being the body, and the second convolutional neural network is used to characterize a corresponding relationship between the second feature map and the probability map; and acquiring, in the first feature map, the area corresponding to a position in the probability map having the pixel value greater than a predetermined first probability threshold as the body feature area.

10. The apparatus according to claim 9, wherein the acquiring, in the first feature map, the area corresponding to the position in the probability map having the pixel value greater than the predetermined first probability threshold as the body feature area, comprises:

calculating a first proportional relationship between the probability map and the first feature map; and acquiring the body feature area from the first feature map based on the first proportional relationship.

11. The apparatus according to claim 10, wherein the obtaining the body frame of the body corresponding to the body image in the to-be-detected image based on the body feature area comprises:

calculating a second proportional relationship between the first feature map and the to-be-detected image;

determining, based on a coordinate of a vertex of the body feature area and the second proportional relationship, a corresponding coordinate of the vertex of the body feature area in the to-be-detected image; and determining the body frame in the to-be-detected image based on the corresponding coordinate of the vertex of the body feature area in the to-be-detected image.

12. The apparatus according to claim 7, wherein the body key point detection model is obtained by training through a following approach:

acquiring a set of samples, wherein each of the samples is a sample image comprising an annotation, and the annotation includes the body frame of the body corresponding to the body image, the position of the body key point, and the judgment result of whether the body key point belongs to the body in the sample image; and training an initial convolutional neural network by using the set of samples to obtain the body key point detection model.

13. A non-transitory computer-readable storage medium storing a computer program, wherein the computer program, when executed by one or more processors, causes the one or more processors to perform operations, the operations comprising:

acquiring a to-be-detected image, the to-be-detected image comprising a body image;

detecting a body frame of a body corresponding to the body image, and a position of a body key point, and determining a judgment result of whether the detected body key point belongs to the body corresponding to the body image in the to-be-detected image by importing the to-be-detected image into a pre-established body key point detection model, the body key point detection model comprising a feature extraction network, a body detection network and a body key point detection network, and judge whether the detected body key point belongs to the body corresponding to the body image in the to-be-detected image; and outputting the body frame of the body corresponding to the body image, the position of the body key point, and the judgment result of whether the detected body key point belongs to the body in the to-be-detected image;

wherein the detecting the body frame of the body corresponding to the body image, and the position of the body key point, and determining the judgment result of whether the detected body key point belongs to the body corresponding to the body image in the to-be-detected image by importing the to-be-detected image into the pre-established body key point detection model, comprises:

importing the to-be-detected image into the feature extraction network to obtain a first feature map, wherein a corresponding relationship between the to-be-detected image and the first feature map is represented by the feature extraction network;

importing the first feature map into the body detection network to obtain a body feature area in the first feature map, wherein a corresponding relationship between the first feature map and the body feature area is represented by the body detection network;

obtaining the body frame of the body corresponding to the body image in the to-be-detected image based on the body feature area; and importing the body feature area into the body key point detection network to obtain the position of the body key point, and the judgment result of whether the body key point belongs to the body corresponding to the body image in the to-be-detected image, wherein a corresponding relationship between the body feature area, and the position of the body key point and the judgment result of whether the body key point belongs to the body is represented by the body key point detection network.

\* \* \* \* \*